Figure 1:
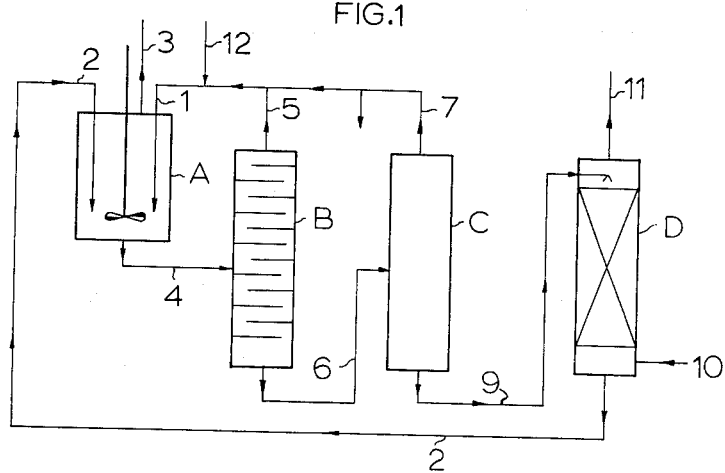

3,214,458
NITRITE ESTERS
Abraham H. de Rooij, Geleen, and Pierre A. M. Aggenbach, Brunssum, Netherlands, assignors to Stamicarbon N.V., Heerlen, Netherlands
Filed Feb. 23, 1965, Ser. No. 434,545
Claims priority, application Netherlands, Feb. 28, 1964, 640/62
5 Claims. (Cl. 260—467)

The present invention relates to the preparation of nitrite esters or mixtures thereof. More particularly, the invention is concerned with the preparation of nitrite esters of alcohols such as methyl nitrite, ethyl nitrite, butyl nitrite, amyl nitrite, and cyclohexyl nitrite.

It is known to prepare such nitrite esters by reacting the alcohol in question with an alkali nitrite and an acid, such as hydrochloric acid or sulphuric acid. However, such a process has the disadvantage that, in addition to the ester, an equivalent amount of an alkali salt is produced.

To avoid this, it has also been proposed to prepare the esters directly from the alcohol in question and nitrous gases (see U.S. Patents 2,739,166 and 2,831,882). However, with such a process, the efficiency remains below 90%.

The principal object of the present invention is to provide a process for preparing nitrite esters whereby prior art problems are obviated. A more specific object of the invention is to provide such a process wherein no salt is formed as secondary product and conversion efficiencies of 95%, or even higher, can be obtained. Other objects will also be hereinafter apparent.

According to the present invention, the formation of nitrite ester is effected by reacting an excess of the alcohol concerned with a solution of nitrosylsulphuric acid in sulphuric acid. The excess alcohol is necessary to completely convert all of the nitrosylsulphuric acid. Otherwise nitrous gases are formed which contaminate the resulting ester. The excess alcohol needed may be varied within wide limits but in practice, an excess of, for example, 5 to 60%, is usually adequate. An even greater excess, i.e. more than 60%, may also be used since this does not retard the process and in fact serves to accelerate the reaction.

The reaction proceeds according to the following overall reaction:

$$x\text{ROH} + \text{NOHSO}_4 \rightarrow \text{RONO} + \text{H}_2\text{SO}_4 + (x-1)\text{ROH}$$

in which ROH denotes the alcohol and $x$ represents the mols of alcohol employed. As will be recognized, $(x-1)$ represents the excess alcohol.

Apparently the reaction of the invention takes place in two stages wherein nitrous acid is first formed according to the equation:

$$\text{H}_2\text{O} + \text{NOHSO}_4 \rightarrow \text{HONO} + \text{H}_2\text{SO}_4$$

and this nitrous acid then reacts with alcohol to form the nitrite ester:

$$\text{ROH} + \text{HONO} \rightarrow \text{RONO} + \text{H}_2\text{O}.$$

A solution of nitrosylsulphuric acid in sulphuric acid is obtainable in a convenient way by absorption of nitrous gases in sulphuric acid. To obtain a quantitative absorption, the sulphuric acid should have a concentration of at least 80% by weight. A solution containing nitrosylsulphuric acid may then be obtained which has a molecular composition of, for example, 2 moles of $\text{NOHSO}_4$ and 6 moles of $\text{H}_2\text{SO}_4$ per 9 moles of $\text{H}_2\text{O}$, i.e. a solution of nitrosylsulphuric acid in 78.5% by weight of sulphuric acid. This sulphuric acid concentration is somewhat too high for optimum results since it has been found that ester formation has a high efficiency only at considerably lower sulphuric acid concentrations (e.g. 10 to 50%, typically 45% sulphuric acid concentration). Accordingly, if there is to be used a solution of nitrosylsulphuric acid prepared by absorption of nitrous gases in aqueous sulphuric acid as described, this solution should normally be diluted to give the preferred concentration for ester formation.

The reaction temperature may be varied. However, just as higher sulphuric acid concentrations seem to lower the yield of ester, it appears that the yield of ester is also decreased when higher temperatures are used. In the circumstances, it is usually preferred to use a temperature in the range of 10 to 25° C., although temperatures outside this range may be useful and the temperature selected in any particular case will depend on the other reaction conditions, especially the sulphuric acid concentration of the nitrosylsulphuric acid solution.

The following table is a summary of results obtained in the preparation of methyl nitrite under varying conditions of reaction temperature and sulphuric-acid concentration. The preparation was carried out continuously, i.e. equivalent amounts of methyl alcohol and nitrosylsulphuric acid were continuously added to a reaction mixture of a given composition and the resulting methyl nitrite was continuously discharged as a gas.

It will be noted from the table that the highest amount of ester is present in the gas discharged from the system when the reaction temperature is in the range of 10–25° C. and the sulphuric acid concentration is from 10–40%. Thus, if a solution of nitrosylsulphuric acid in sulphuric acid is available for use with a substantially higher concentration, e.g. a solution of nitrosylsulphuric acid in 78.5% by weight of sulphuric acid, so much water should be added to the reaction mixture that the sulphuric acid content will not considerably exceed, for example, 45% by weight of the solution during the reaction and at such acid concentration, the temperature of the reaction mixture should be maintained at, e.g. 25° C. or lower.

| Example | Reaction Temp., ° C. | Composition of the reaction mixture | | | Methyl nitrite contained in the gas discharged in percent by volume |
|---|---|---|---|---|---|
| | | H₂O in percent by weight | Methyl alcohol in percent by weight | Sulphuric acid in percent by weight | |
| 1 | 10 | 80 | 10 | 10 | 100 |
| 2 | 25 | 80 | 10 | 10 | 100 |
| 3 | 50 | 80 | 10 | 10 | 95 |
| 4 | 10 | 50 | 10 | 40 | 100 |
| 5 | 25 | 50 | 10 | 40 | 96 |
| 6 | 50 | 50 | 10 | 40 | 60 |
| 7 | 0 | 30 | 10 | 60 | 86 |
| 8 | 10 | 30 | 10 | 60 | 47 |
| 9 | 25 | 30 | 10 | 60 | 37 |
| 10 | 50 | 30 | 10 | 60 | 15 |

By preference, the diluted sulphuric acid remaining after the ester formation is concentrated and re-used for the preparation of the nitrosylsulphuric acid.

Figure 2:
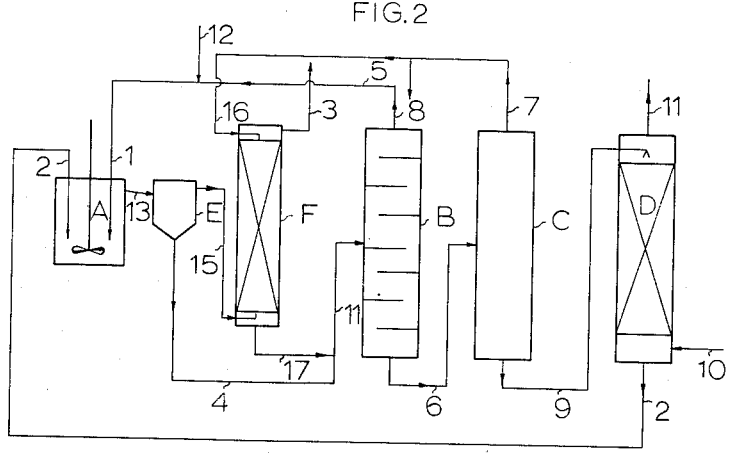

The invention is more fully described by reference to the accompanying drawings wherein:

FIGURE 1 diagrammatically illustrates one way of carrying out the present process for the continuous preparation of an ester which is gaseous under the reaction conditions, such as methyl nitrite, and FIGURE 2 diagrammatically shows a process for the continuous preparation of an ester which is liquid under the reaction conditions, e.g. butyl nitrite.

According to FIGURE 1, the ester formation is effected in reactor (A), into which a mixture of methyl alcohol and water is fed through conduit 1. The nitrosylsulphuric acid dissolved in 78.5% by weight of sulphuric acid is fed to the reactor (A) through conduit 2. The temperature of the reaction mixture is preferably kept at 10° C. The resulting ester leaves the reactor as a vapor through conduit 3, while diluted sulphuric acid, which still contains some dissolved methyl alcohol and methyl nitrite, is passed through conduit 4 into the vacuum-operated distilling column (B). The top product, a mixture of methyl alcohol, methyl nitrite, and water, is passed into conduit 1 through conduit 5. The bottom product, dilute sulphuric acid, is fed into evaporator (C) through conduit 6, while such a part of the top product, water, as is necessary to maintain a suitable water content in reactor (A) is recycled by passing into conduit 1 through conduit 7. The reaminder is removed from the system through conduit 8.

The bottom product, concentrated sulphuric acid, is passed, through conduit 9, into the top of absorption column (D), where nitrous gases from an ammonia combustion process may be absorbed. The resulting solution of nitrosylsulphuric acid in sulphuric acid flows into reactor (A) through conduit 2. The residual gases freed of nitrous gases and consisting substantially of nitrogen and a little oxygen leave the system through conduit 11. The methyl alcohol needed for the reaction is supplied continuously through conduit 12.

In the preparation of an ester that is liquid under the reaction conditions special provisions, namely a separator and an extraction column, must be included to separate the resulting ester from the reaction mixture. To this end, the reaction mixture contained in reactor (A) is passed, according to the arrangement of FIGURE 2, through conduit 13 into a separator (E). In this separator, a top layer consisting essentially of ester and alcohol and a bottom layer consisting essentially of dilute sulphuric acid are formed. The top layer flows through conduit 15 into extraction column (F), where it is washed acid-free with water supplied through conduit 16. The top product then discharged through conduit 3 is a mixture of the ester and alcohol, which may, if desired, be further split up into its constituents in a distillation column (not shown). The solution of alcohol, sulphuric acid, and water discharged from the bottom of extraction column (F) is added, through conduit 17, to the layer of dilute sulphuric acid discharged from separator (E) through conduit 4 and is further treated in the manner indicated in FIGURE 1, by passing the liquid into distillation column (B) and then returning the resulting top product, a mixture of alcohol and water, to reactor (A) through conduit 5.

The bottom product, dilute sulphuric acid, from distillation column (B) is concentrated in evaporator (C) in the same way as indicated in FIGURE 1. Part of the resulting top product, water, is removed from the system through conduit 7, part of it through conduit 8, and the remainder is recycled through conduit 16. The concentrated sulphuric acid constituting the bottom product is used in column (D) as an absorption agent for the nitrous gases supplied through conduit 10.

The following example represents one way of operating according to the invention and is given for purposes of further illustrating, without limiting, the invention:

To obtain a production of 1000 kg. of methyl nitrite in a process using the system of FIGURE 1, 528 kg. of methyl alcohol were supplied through conduit 12 and 2924 m.$^3$ of nitrous gases with a nitrous content of 12.5% by volume and a dew point of 15° C. were fed into the system through conduit 10.

Reactor (A) which is kept at 10° C. then received 8876 kg. of a mixture of methyl alcohol and water consisting of 832 kg. of methyl alcohol, 7988 kg. of water, and 56 kg. of methyl nitrite, through conduit 1, and 8230 kg. of sulphuric acid containing nitrosylsulphuric acid consisting of 2082 kg. of NOHSO$_4$, 4820 kg. of H$_2$SO$_4$, and 1328 kg. of H$_2$O, through conduit 2.

In distilling column (B) the top product was a mixture of 304 kg. of methyl alcohol, 2366 kg. of water, and 56 kg. of methyl nitrite. This top product was recycled to reactor (A). The bottom product amounted to 13365 kg. of 48%-by-weight sulphuric acid. This sulphuric acid was concentrated in column (C) to 83%-by-weight sulphuric acid, which was then used in column (D) as an absorbent for the nitrous gases.

35 kg. of the water issuing from column (C) as a top product were removed from the system via conduit 8. The remainder of the water was returned to reactor (A). The resulting methyl nitrite, which left reactor (A) as a gas through conduit 3 contained 1.6 kg. of water and 3.3 kg. of methyl alcohol per 1000 kg. of methyl nitrite.

While the invention has been described above with particular reference to the preparation of methyl nitrite using methanol, it will be recognized that the present process may be utilized to prepare the nitrite esters of, for example, other lower alkanols such as ethanol, propanol, butanol and amyl alcohol; cyclic alkanols such as cyclohexanol, etc. Various other modifications may also be made in the invention. Hence the scope thereof is defined in the following claims wherein:

We claim:
1. A process for preparing a nitrite ester of an alcohol which comprises reacting an excess of the alcohol selected from the group consisting of lower alkanols and cyclic alkanols with a solution of nitrosylsulphuric acid in sulphuric acid to provide a reaction mixture of nitrite ester, sulphuric acid, unreacted alcohol and water and thereafter separating said ester from said reaction mixture.

2. The process of claim 1 wherein the alcohol is used in sufficient excess to convert all of said nitrosylsulphuric acid to said ester.

3. The process of claim 2 wherein the reaction temperature is below 25° C. and the concentration of sulphuric acid in said solution does not exceed 50% by weight.

4. The process of claim 3 wherein the reaction temperature is 10–25° C. and the sulphuric acid concentration of said solution is from 10–40% by weight.

5. The process of claim 1 wherein the unreacted alcohol is removed from the reaction mixture after separation of said ester, the alcohol and ester-free mixture is then concentrated by removal of water and utilized to prepare said nitrosylsulphuric acid by absorption of nitrous gases.

References Cited by the Examiner
Coe et al.: J. Am. Chem. Soc., vol. 70, pages 1516–1519 (1948), QD 1 A5.

CARL D. QUARFORTH, *Primary Examiner.*